(12) United States Patent
Polignone et al.

(10) Patent No.: US 11,891,592 B2
(45) Date of Patent: Feb. 6, 2024

(54) COMPOSITIONS FOR THE REMOVAL OF SILICONE CONFORMAL COATINGS FROM A PRINTED CIRCUIT BOARD

(71) Applicant: NuGeneration Technologies, LLC, Emeryville, CA (US)

(72) Inventors: Donato Polignone, Emeryville, CA (US); Stephen Utschig-Samuels, Emeryville, CA (US)

(73) Assignee: NuGeneration Technologies, LLC, Emeryville, CA (US)

( * ) Notice: Subject to any disclaimer, the term of this patent is extended or adjusted under 35 U.S.C. 154(b) by 0 days.

(21) Appl. No.: 17/812,969

(22) Filed: Jul. 15, 2022

(65) Prior Publication Data

US 2022/0348848 A1 Nov. 3, 2022

Related U.S. Application Data

(63) Continuation of application No. 16/704,208, filed on Dec. 5, 2019, now Pat. No. 11,414,631.

(60) Provisional application No. 62/852,950, filed on May 24, 2019.

(51) Int. Cl.
| | | |
|---|---|---|
| *C11D 9/36* | (2006.01) |
| *C11D 7/50* | (2006.01) |
| *B08B 3/08* | (2006.01) |
| *C11D 17/00* | (2006.01) |
| *C09D 9/00* | (2006.01) |
| *C11D 11/00* | (2006.01) |

(52) U.S. Cl.
CPC ............. *C11D 7/5031* (2013.01); *B08B 3/08* (2013.01); *C09D 9/005* (2013.01); *C11D 7/5009* (2013.01); *C11D 7/5022* (2013.01); *C11D 11/0047* (2013.01); *C11D 17/0043* (2013.01)

(58) Field of Classification Search
CPC ..... C11D 11/0047; C11D 7/5013; C11D 9/36; C11D 3/43; C11D 3/2041; C11D 3/2068; C11D 7/5022

See application file for complete search history.

(56) References Cited

U.S. PATENT DOCUMENTS

| | | | | |
|---|---|---|---|---|
| 5,454,970 A | * | 10/1995 | Flaningam ........... | C11D 7/5095 134/40 |
| 5,478,493 A | * | 12/1995 | Flaningam ............. | C23G 5/032 134/40 |
| 5,628,833 A | * | 5/1997 | McCormack .......... | C11D 7/261 134/42 |
| 5,824,632 A | * | 10/1998 | Flaningam ............. | B01D 12/00 510/505 |
| 2003/0228997 A1 | * | 12/2003 | Doyel .................. | C11D 7/5018 510/415 |
| 2008/0239776 A1 | | 10/2008 | Mance et al. | |
| 2019/0211210 A1 | | 7/2019 | Wojtczak et al. | |
| 2020/0231824 A1 | | 7/2020 | Donate et al. | |

* cited by examiner

*Primary Examiner* — Charles I Boyer
(74) *Attorney, Agent, or Firm* — Brian M. Kaufman; Robert D. Atkins; PATENT LAW GROUP: Atkins and Associates, P.C.

(57) ABSTRACT

A solvent composition has an oxygenated solvent and a siloxane solvent. In one embodiment, the oxygenated solvent is propylene glycol methyl ether and the siloxane solvent is hexamethyldisiloxane or octamethyltrisiloxane. In another embodiment, the solvent composition is an azeotrope of propylene glycol n-butyl ether and decamethyltetrasiloxane. The siloxane solvent can be used in any situation where one desires to remove a silicone deposit, e.g., conformal coatings, adhesives, sealants, greases, heat transfer fluids, paints, oils, etc.

11 Claims, 10 Drawing Sheets

COMPOSITIONS FOR THE REMOVAL OF SILICONE CONFORMAL COATINGS FROM A PRINTED CIRCUIT BOARD

CLAIM OF DOMESTIC PRIORITY

The present application is a continuation of U.S. patent application Ser. No. 16/704,208, filed Dec. 5, 2019, which claims the benefit of U.S. Provisional Application No. 62/852,950, filed May 24, 2019, which application are incorporated herein by reference.

FIELD OF THE INVENTION

The present invention relates to compositions for the removal of cured or uncured silicone deposits, methods of making, and methods of using the compositions.

BACKGROUND OF THE INVENTION

Silicone is commonly used in a wide variety of fields. Silicone is used to provide electrical insulation, as a protective coating over electronics, as a sealant in household, automotive, or aerospace uses, and in innumerable other situations. Silicone comes into play in almost every conceivable industry.

Silicone-containing fluids can be reactive or non-reactive depending upon the formulation and desired end use. These fluids are selected for use due to their versatility, durability, and water and chemical resistance. Forms associated with reactive and non-reactive silicone fluids range from uncured oils, greases, and heat transfer fluids, to cured sealants, adhesives, paints, and conformal coatings. All silicone-containing fluids are notoriously difficult to clean or remove from industrial and surface mount technology surfaces without damaging the substrates, or without requiring high temperatures and specialized equipment.

Uncured silicone fluids typically require cleaning solution temperatures above the silicone fluid softening point, which is often unattainable in typical cleaning applications. Cured silicone fluids typically require a digestant in aqueous media to break the polymeric silanol network, and these common digestants are potentially damaging to the substrate to which they are attached since silanol bonds of cured silicone fluids are formed with the active substrate as well.

Siloxane solvents have been used to remove silicone deposits, because siloxane reacts with silicone. However, using siloxane solvents involves at least two major drawbacks. First, siloxane solvents are prohibitively expensive for most use-cases. Second, a lot of silicone adhesives, coatings, greases, etc., include other ingredients besides purely silicone. The additives reduce the effectiveness of the siloxane solvents.

Therefore, a need exists for improved solvent compositions for removal of silicone deposits.

DETAILED DESCRIPTION

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Combining a volatile siloxane solvent with an oxygenated solvent in the diol or glycol ether class creates a broad-spectrum silicone deposit removal solution that acts on a wide variety of both cured and uncured silicone fluids or deposits, does not require extreme temperatures to reach the silicone fluid softening points, and can interrupt the polymeric silanol network of cured silicone fluids without damaging substrate material.

The oxygenated solvent is selected from the following non-exhaustive list in some embodiments: ethylene glycol, diethylene glycol, triethylene glycol, propylene glycol, dipropylene glycol, tripropylene glycol, butylene glycol, dibutylene glycol, tributylene glycol, pentylene glycol, dipentylene glycol, tripentylene glycol, hexylene glycol, dihexylene glycol, trihexylene glycol, heptylene glycol, diheptylene glycol, triheptylene glycol, octylene glycol, dioctylene glycol, trioctylene glycol, propylene glycol methyl ether, dipropylene glycol methyl ether, tripropylene glycol methyl ether, propylene glycol methyl ether acetate, dipropylene glycol methyl ether acetate, propylene glycol n-propyl ether, dipropylene glycol n-propyl ether, propylene glycol n-butyl ether, dipropylene glycol n-butyl ether, tripropylene glycol n-butyl ether, propylene glycol phenyl ether, propylene glycol diacetate, dipropylene glycol dimethyl ether, diethylene glycol ethyl ether, diethylene glycol methyl ether, diethylene glycol n-butyl ether, diethylene glycol hexyl ether, diethylene glycol n-butyl ether acetate, ethylene glycol propyl ether, ethylene glycol n-butyl ether, ethylene glycol hexyl ether, ethylene glycol n-butyl ether acetate, triethylene glycol methyl ether, triethylene glycol ethyl ether, triethylene glycol n-butyl ether, ethylene glycol phenyl ether, and ethylene glycol n-butyl ether.

The siloxane solvent is selected from the following non-exhaustive list in some embodiments: hexamethyldisiloxane, octamethyltrisiloxane, decamethyltetrasiloxane, dodecamethylpentasiloxane, polydimethylsiloxane, phenyl-methylsiloxane, dimethyl-diphenylsiloxane, cyclomethicone, octamethylcyclotetrasiloxane, decamethylcyclopentasiloxane, dodecamethylcyclohexasiloxane, and polymethylhydrogensiloxane.

Figure 1A:
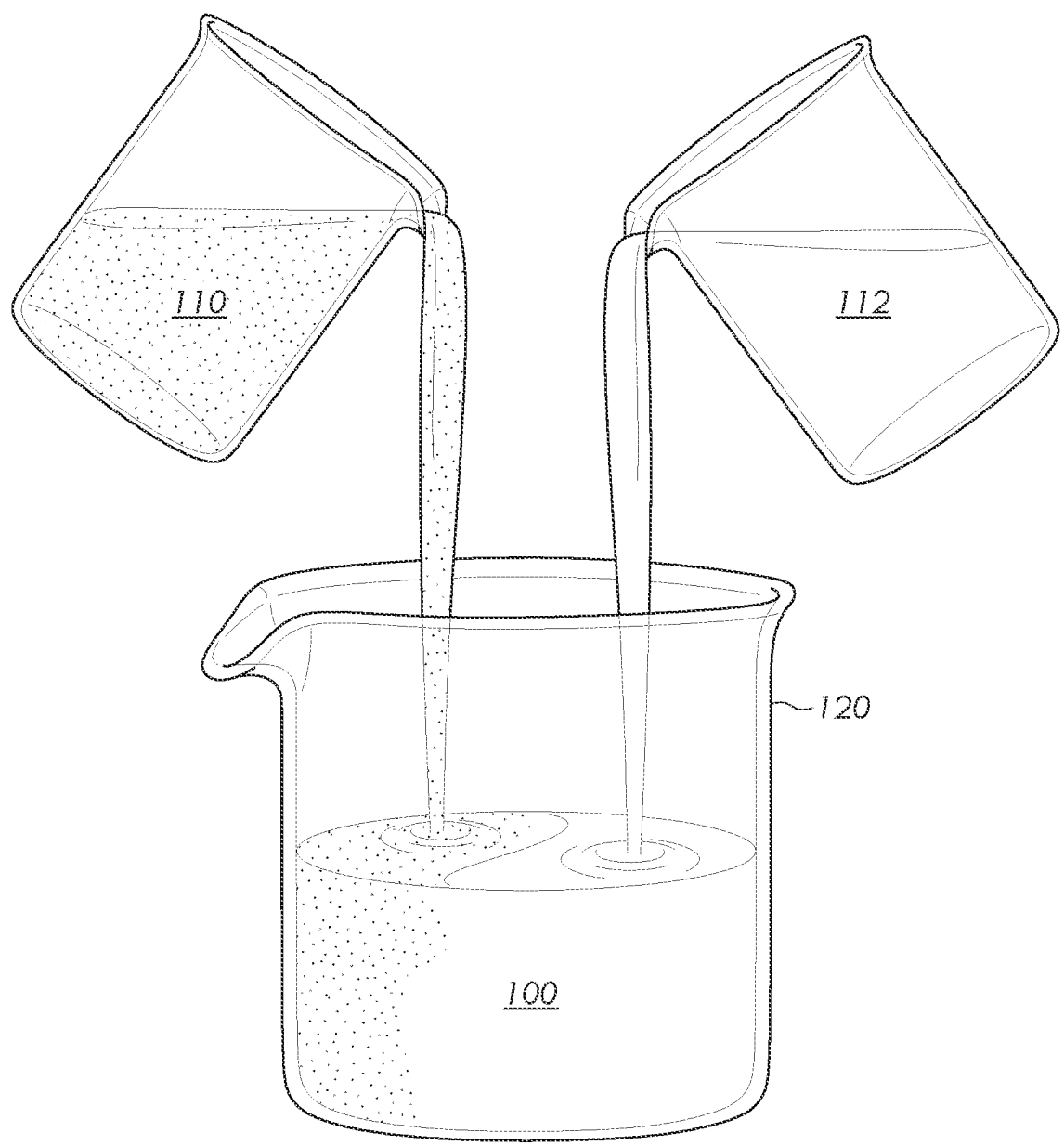
FIGS. 1a and 1b illustrate mixing a plurality of solvents to form a new solvent composition.
Figure 1B:
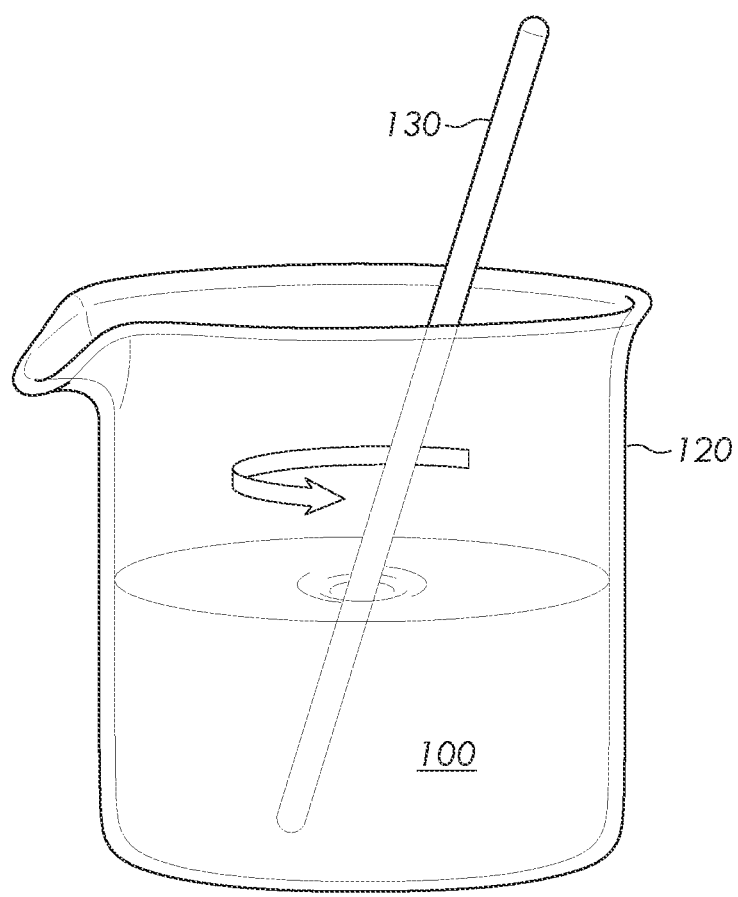

To create the new solvent composition, any of the desired solvents are mixed together, with at least one oxygenated solvent and one siloxane solvent in the mixture. FIGS. 1a and 1b illustrates mixing two solvents two create a new solvent composition 100. An oxygenated solvent 110 and a siloxane solvent 112 are each poured into a beaker or other container 120 in FIG. 1a. Any suitable container for mixing solvents can be used instead of beaker 120, e.g., a vat, a bucket, a bottle, a barrel or drum, etc. Oxygenated solvent 110 and siloxane solvent 112 can be poured from beakers, bottles, or another suitable container as illustrated, from a machine with a fluid conduit and nozzle, or via any other suitable fluid dispensing mechanism. Oxygenated solvent 110 and siloxane solvent 112 can be dispensed simultaneously or one after the other with either solvent added to the other.

Oxygenated solvent 110 and siloxane solvent 112 will typically be able to thoroughly mix simply by adding the two solvents into a container together. However, in some cases the solvents may need to be agitated to fully mix into solvent composition 100. FIG. 1B illustrates agitating using a mixing rod 130. Mixing rod 130 is inserted into beaker 120 and moved around to cause oxygenated solvent 110 and siloxane solvent 112 to mix together into solvent composition 100. The solvents can be agitated by inserting any suitable mixing device into beaker 120, e.g., a spoon, spatula, or paint mixer. In some embodiments, a motor is attached to the mixing device to automatically agitate the solvents. The solvents can also be mixed by agitating beaker 120 while both solvents are contained in the beaker, e.g., by placing the beaker on a moving platform or by picking up and moving the beaker around.

Solvent composition 100 is shown as a binary solvent, with two constituent solvents. However, solvent composition 100 can also be formed as a ternary solvent with three constituent solvents, a quaternary solvent with four constituent solvents, or even more solvents could be combined. The key is that at least one oxygenated solvent and one siloxane solvent is used. Binary solvents operate better in some situations than mixing a higher number of solvents because the smaller solvent molecules in a binary solvent will get into the microscopic pores of the silicone material easier. Steric hinderance can become a problem with some ternary or quaternary solvents for some uses. However, having the additional qualities of more solvents in solvent composition 100 may be preferable in other use-cases.

One consideration for selecting the specific solvents to combine is boiling point, evaporation rate, or vapor pressure. For most use-cases, a faster evaporating solvent is desirable so that the solvent evaporates off of the substrate quicker. Therefore, constituent solvents with a faster evaporation rate, lower vapor pressure, or lower boiling point can be selected to reduce the amount of time the solvent composition 100 remains on the substrate after application.

Of the above-listed solvents, propylene glycol methyl ether is the fastest evaporating oxygenated solvent, and hexamethyldisiloxane is the fastest evaporating siloxane solvent. Therefore, a mixture with propylene glycol methyl ether as oxygenated solvent 110 and hexamethyldisiloxane as siloxane solvent 112 makes a suitable solvent composition 100 with a relatively fast evaporation rate. Octamethyltrisiloxane is the second fastest evaporating siloxane solvent of the above-listed solvents. A mixture of propylene glycol methyl ether as oxygenated solvent 110 and octamethyltrisiloxane as siloxane solvent 112 would also make a suitable solvent composition 100 with a relatively fast evaporation rate.

Oxygenated solvent 110 and siloxane solvent 112 can be mixed in any ratio. Siloxane solvent 112 is generally more expensive than oxygenated solvent 110. Therefore, a lower percentage of siloxane solvent 112 will generally reduce the overall cost of solvent composition 100. However, lowering the percentage of siloxane solvent 112 below a lower threshold will undesirably reduce the effectiveness of solvent composition 100 at dissolving silicone. Reducing the percentage of siloxane solvent 112 below about 15% by weight has been found to affect the ability of solvent composition 100 to dissolve silicone, while keeping the percentage at or above 15% has not had a significant impact on the capabilities of the solvent composition. Therefore, in one embodiment, solvent composition 100 is formed with 15% by weight or greater of siloxane solvent 112.

In some cases, a particular oxygenated solvent 110 matched with a particular siloxane solvent 112 forms an azeotrope. An azeotrope is a mixture of two or more liquids whose proportions cannot be altered or changed by simple distillation. This happens because when an azeotrope is boiled, the resultant vapor has the same proportions of constituents as the unboiled mixture. To form an azeotrope, a certain percentage of each constituent solvent is required depending on the particular solvents selected. For some combinations of particular oxygenated solvents 110 and siloxane solvents 112, an azeotrope is not possible. For other solvents, the azeotrope may have undesirable properties, such as a slower evaporation rate than the constituents or requiring a percentage of siloxane solvent 112 that is too low for the solvent composition 100 to be effective.

One particular effective azeotrope is a mixture using propylene glycol n-butyl ether for oxygenated solvent 110 and decamethyltetrasiloxane for siloxane solvent 112. An azeotrope is formed when mixed in the ratio of 15% decamethyltetrasiloxane to 85% propylene glycol n-butyl ether by weight. While neither of the individual solvents in the azeotrope are the fastest evaporating from their respective lists above, the azeotrope has a faster evaporating rate than either of the constituent solvents. The azeotrope formed with 15% decamethyltetrasiloxane and 85% propylene glycol n-butyl ether has an evaporation rate that is on par with any other known combination.

Figure 2A:
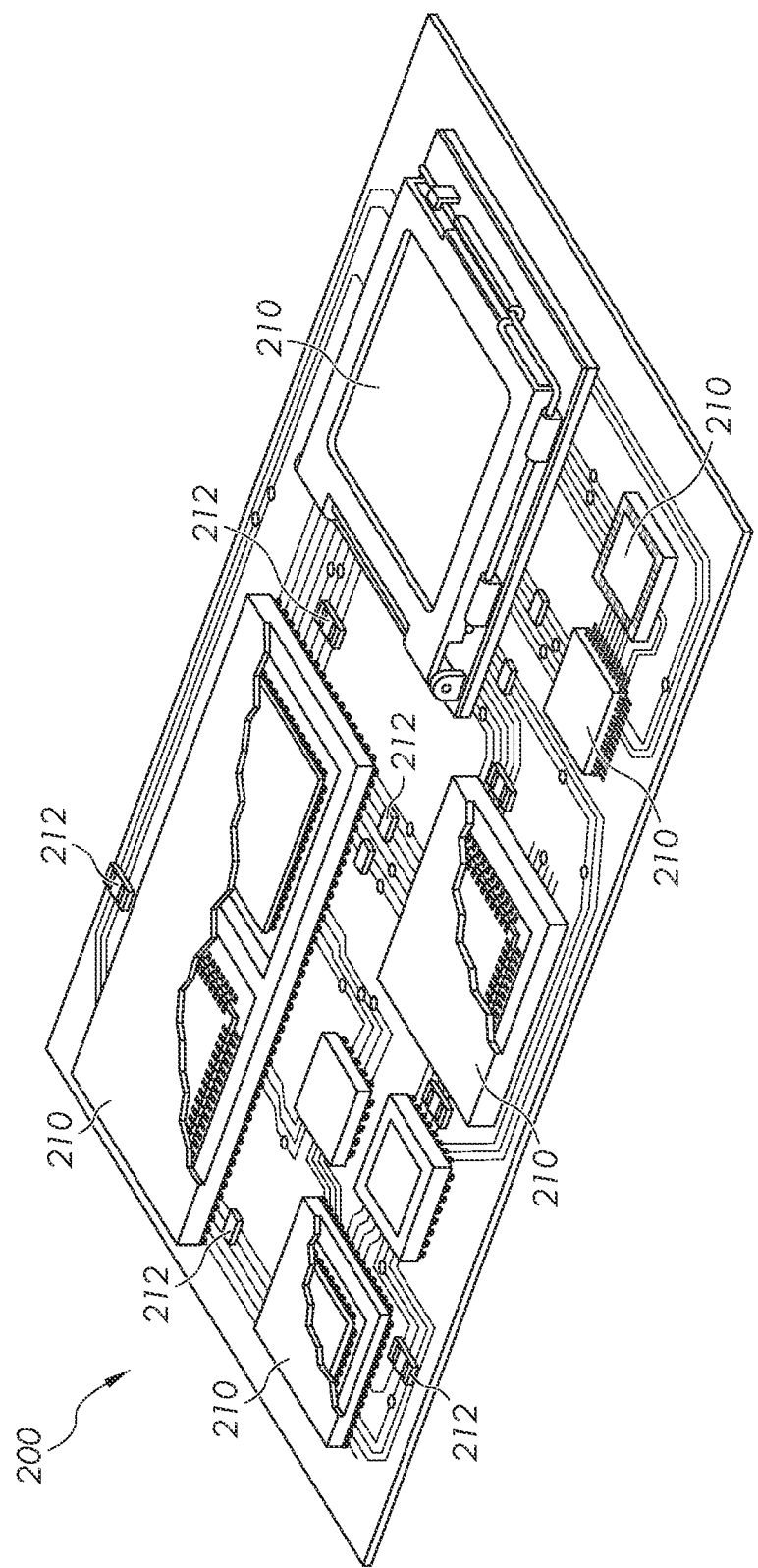
FIGS. 2a-2h illustrate removing a conformal silicone coating from a PCB using the new solvent composition.

Once solvent composition 100 has been mixed using any of the above described combinations, the solvent composition can be used in any situation where one desires a silicone deposit be removed. FIGS. 2a-2h illustrate one situation in which solvent composition 100 is particularly useful. FIG. 2a shows an exemplary printed circuit board (PCB) 200. PCB 200 can have any combination of electrical components mounted onto the PCB. PCB 200 can be a stand-alone electrical system that uses the semiconductor packages to perform one or more electrical functions, such as an HVAC controller or a vehicle electronic control unit. Alternatively, PCB 200 can be a subcomponent of a larger system. For example, PCB 200 can be part of a tablet computer, cellular phone, digital camera, communication system, or other electronic device. PCB 200 can also be a graphics card, network interface card, or another signal processing card that is inserted into a computer.

In FIG. 2a, a variety of semiconductor packages 210 and surface mount components 212 are mounted onto PCB 200 to form an electrical system. In general, any suitable component can be used, such as semiconductor packages with integrated circuits or discrete active or passive parts such as diodes, transistors, inductors, or capacitors. Semiconductor packages 210 can include microprocessors, memories, ASICs, logic circuits, analog circuits, RF circuits, or other semiconductor die or electrical components. Any other desired electrical component can be used as needed for a desired electrical functionality to be performed by PCB 200.

Figure 2B:
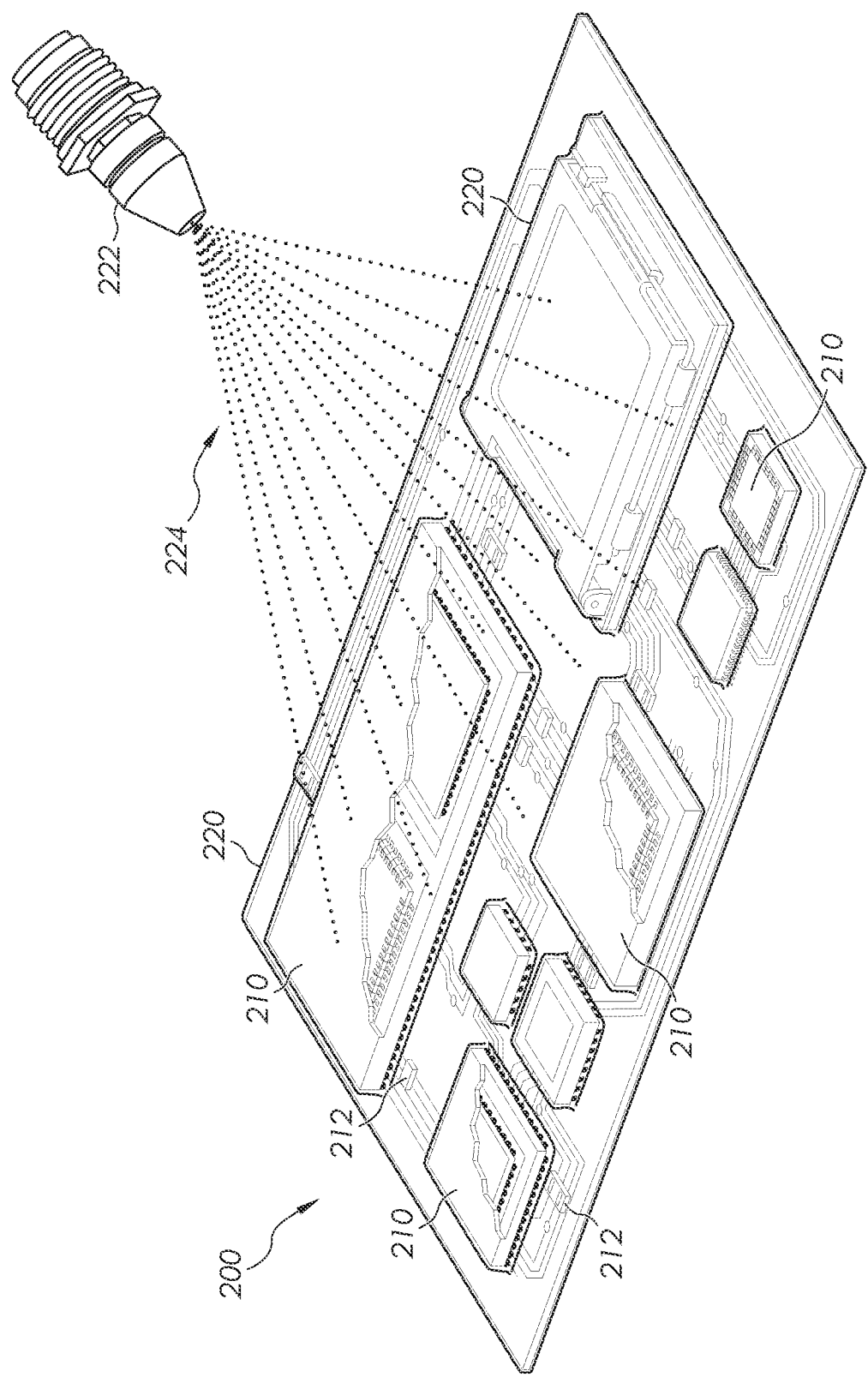

In FIG. 2a, PCB 200 has been completely assembled and is functionally complete. FIG. 2b shows a conformal silicone coating 220 being applied by a spray applicator with nozzle 222. Nozzle 222 releases a mist 224 of silicone material that forms conformal silicone coating 220. Applying conformal silicone coating 220 is a common finishing step to protect a completed PCB from water and other contaminates when deployed.

Figure 2C:
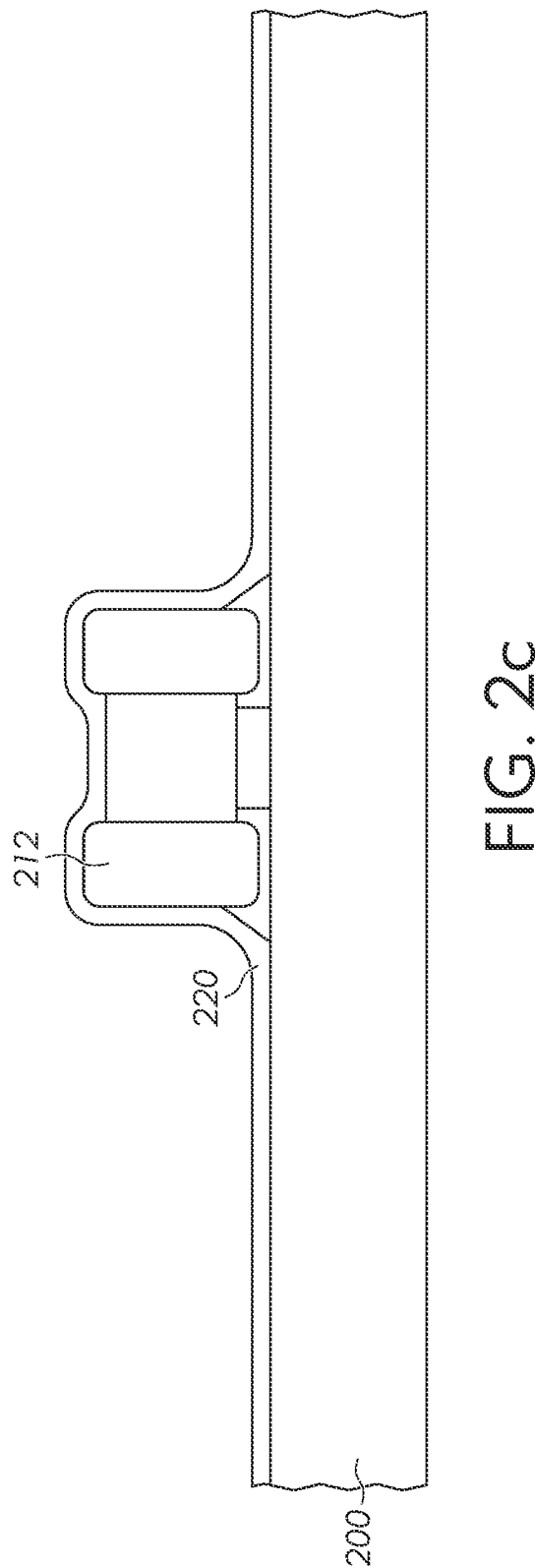

FIG. 2c shows a cross-section of PCB 200 with one of the surface mount components 212 covered in silicone coating 220. One reason that silicone coating 220 may be removed is to replace or upgrade one of the parts. For example, component 212 might be a resistor that has blown out and created an open circuit. A semiconductor package 210 may be replaced to upgrade microcontroller capabilities or memory size. Rather than completely replace PCB 200, components 210 and 212 can be replaced to repair or upgrade the PCB. However, replacing a component is difficult without first removing coating 220 over the component.

Figure 2D:
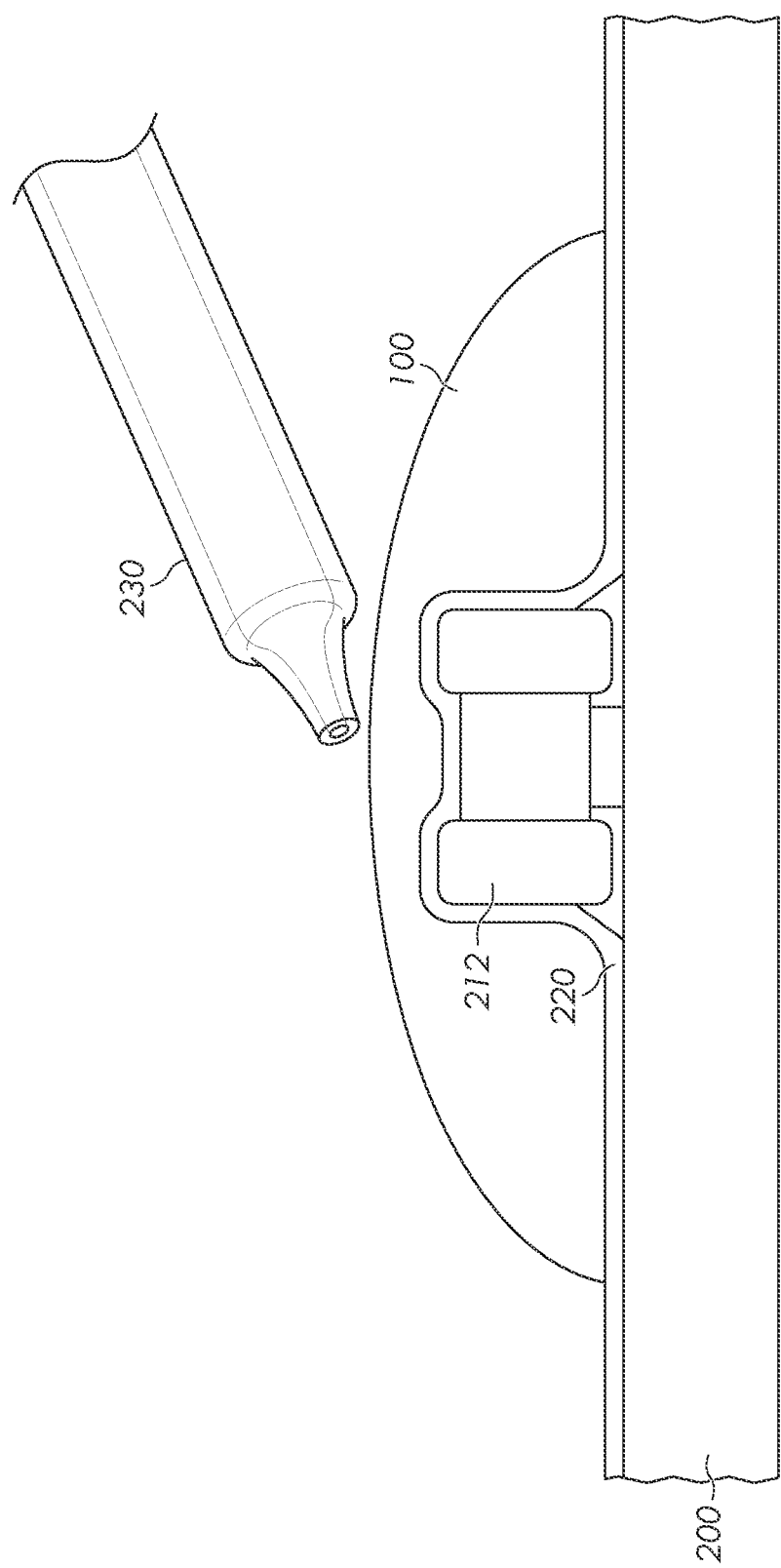

Solvent composition 100 allows removal of coating 220. First, solvent composition 100 is applied onto coating 220. FIG. 2d shows one simple method of applying solvent composition 100 to a small localized area using dropper 230. With dropper 230, coating 220 can be removed over a single component 210 or 212, or a small grouping of components, without removing the coating over the rest of PCB 200.

Solvent composition 100 is deposited onto coating 220 over component 212 in FIG. 2d and immediately begins to dissolve the coating. The siloxane solvent 112 in the mixture attacks the silicone. Oxygenated solvent 110 not only reduces the cost of solvent composition 100, but also improves the dissolving action. When coating 220 is applied, there are usually curing agents mixed in with the silicone. The curing agents absorb water to harden coating 220, which forms a silanol network within the coating. The silanol network provides a relatively high attraction of coating 220 to PCB 200 but is not dissolved by siloxane solvent 112. Oxygenated solvent 110 in solvent composition 100 destroys the silanol network in coating 220, resulting in a much faster dissolving of the coating than having only siloxane solvent 112 to dissolve the silicone portion. Oxygenated solvent 110 also helps remove other impurities such as water and other polarized molecules or flux left over from the manufacture process. Solvent composition 100 can also be used to remove flux during manufacture of electronic devices prior to deposition of coating 220.

Figure 2E:
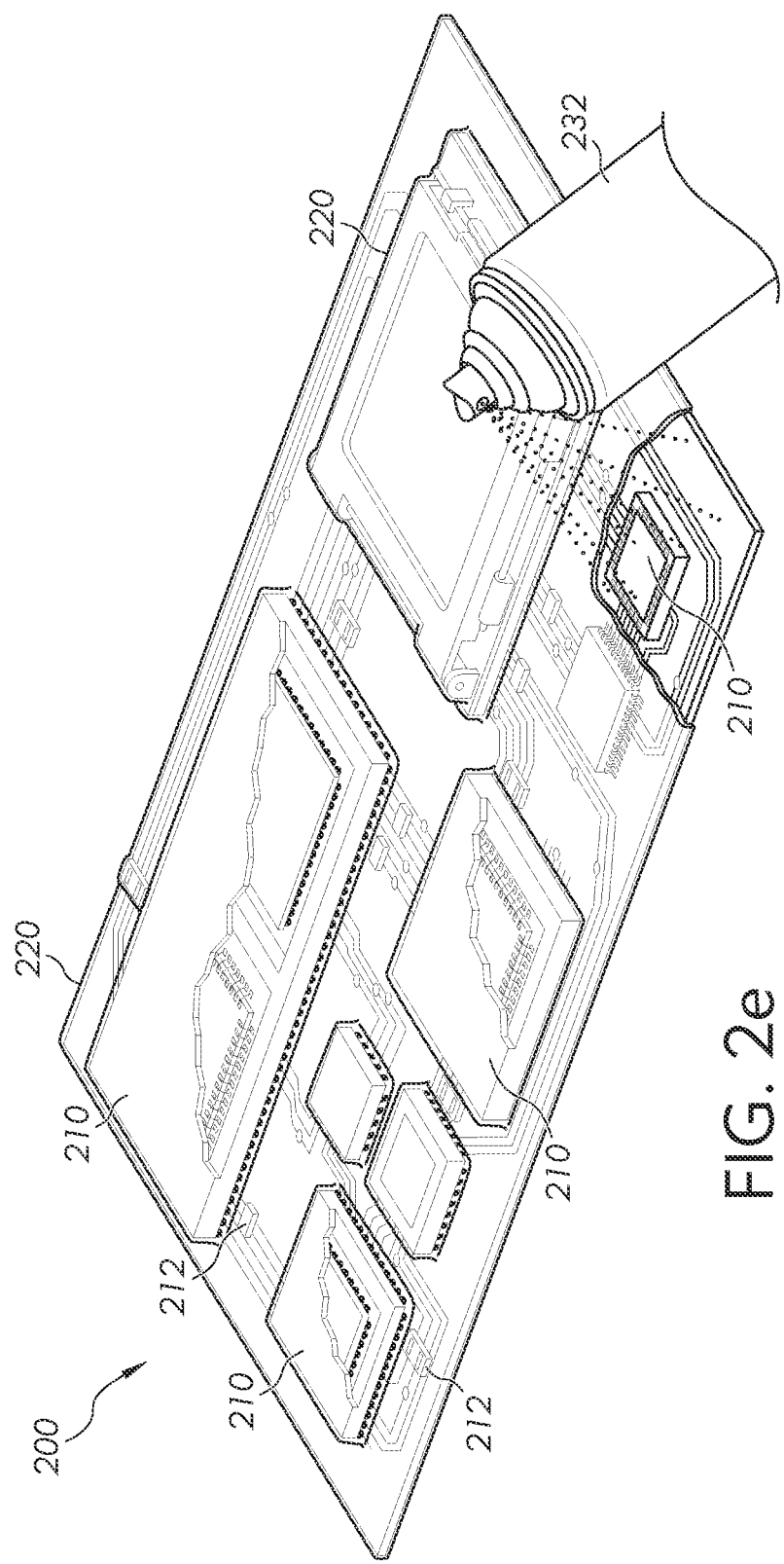
Figure 2F:
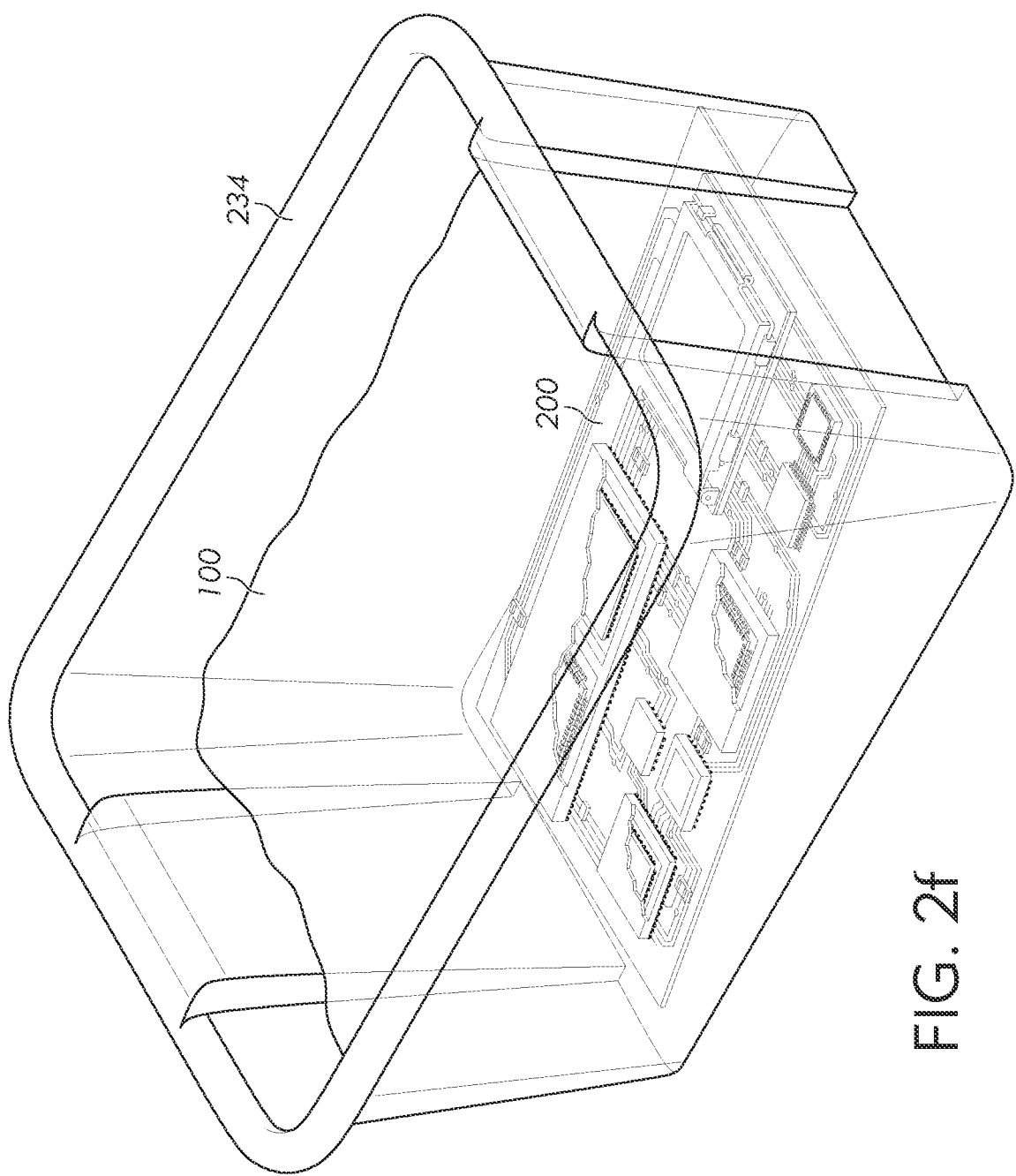

Solvent composition 100 can be applied using any other suitable method. FIGS. 2e and 2f illustrate two other non-limiting methods for application. In FIG. 2e, solvent composition 100 is disposed in an aerosol spray can 232 and sprayed onto PCB 200. Aerosol can 232 allows application of solvent composition 100 over a larger area of PCB 200 than with dropper 230 while still allowing localized application. A user aims the spray stream from aerosol can 232 at a particular component or group of components to remove coating 220 over those component specifically. Alternatively, aerosol can 232 can be used to apply solvent composition 100 over an entire surface of PCB 200.

In one embodiment, aerosol can 232 is used to apply solvent composition 100 over an area of PCB 200, and then the solvent composition is allowed to set on top of coating 220 to dissolve the coating. In another embodiment, aerosol can 232 is used to apply a constant spray of solvent composition 100 onto an area of PCB 200. The continuing spray of solvent composition 100 actively dissolves and washes away coating 220 while the stream flows over PCB 200. Aerosol can 232 can be held at a low angle relative to PCB 200 to spray solvent composition 100 under components and in other tight areas on the PCB, which helps to fully remove coating 220.

For some configurations of solvent composition 100, the ratio of siloxane solvent 112 to oxygenated solvent 110 will need to be increased to provide an adequate stream of the solvent composition from the aerosol nozzle. For a typical aerosol can 232, the mixture of solvent composition 100 may need to be at least 50% by weight of siloxane solvent 112 to create an adequate stream of the solvent composition. The stream could also potentially be improved by modifying aerosol can 232 or by picking different constituent solvents.

In FIG. 2f, PCB 200 is disposed into a bath 234 of solvent composition 100. Bath 234 is a container filled with solvent composition 100 sufficiently to fully cover PCB 200. PCB 200 soaks in bath 234 while solvent composition 100 dissolves coating 220. In some embodiments, a pump is used to create a flow of solvent composition 100 over PCB 200.

Figure 2G:
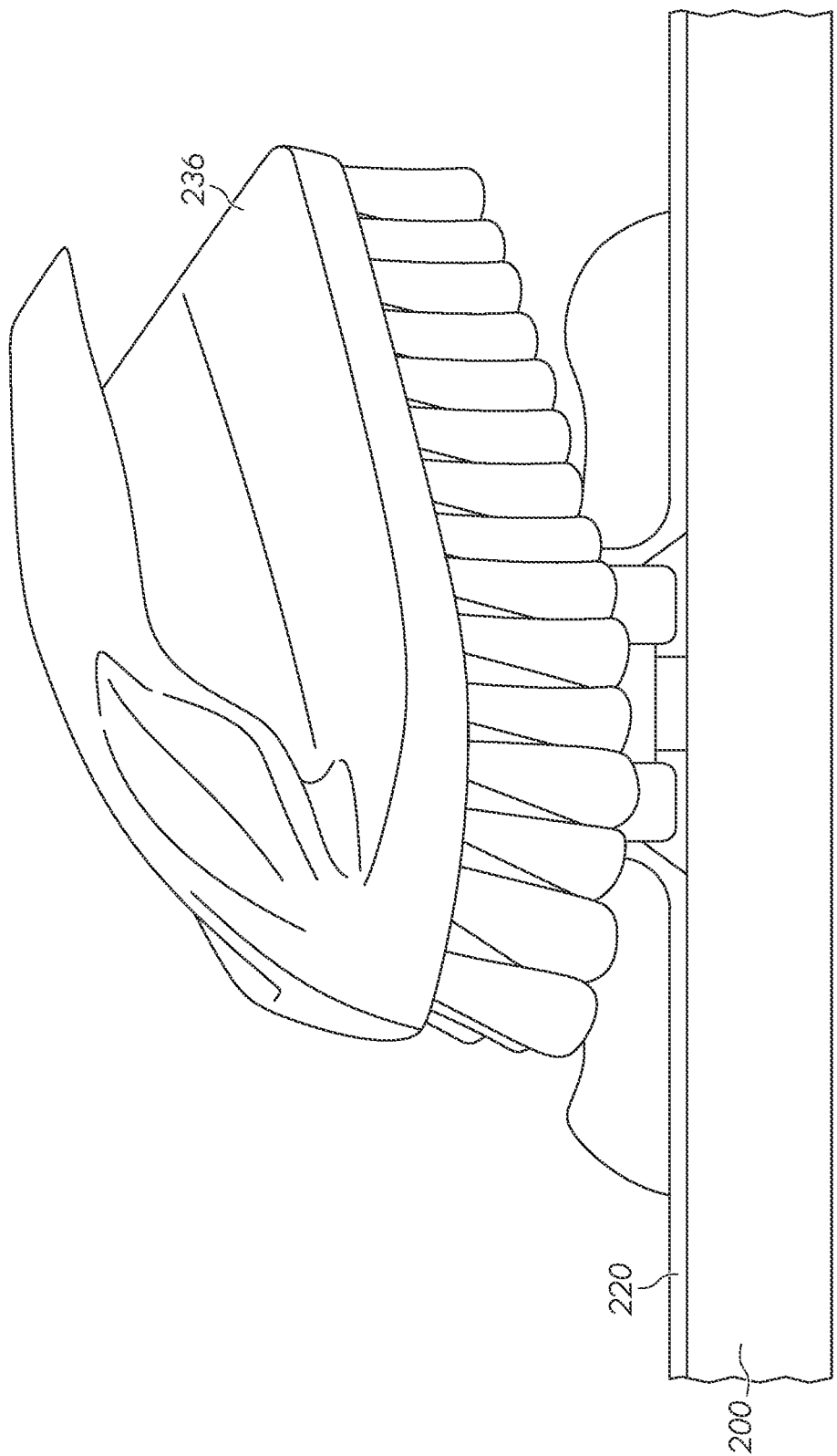

In FIG. 2g, a brush or other tool 236 is used to supplement the dissolving action of solvent composition 100. Solvent composition 100 is first applied using any suitable application method, including those discussed above. After waiting a sufficient time for coating 220 to dissolve, typically a few seconds or minutes, brush 236 can be used to scrub off coating 220. The bristles of brush 236 help remove partially dissolved portions of coating 220 and distribute solvent composition 100 to nooks and crannies where a thicker buildup of the coating was deposited. In other embodiments, brush 236 is used to apply solvent composition 100 without first relying on another application method by dipping the brush in 236 in solvent composition 100 or otherwise applying the solvent composition to the brush.

Figure 2H:
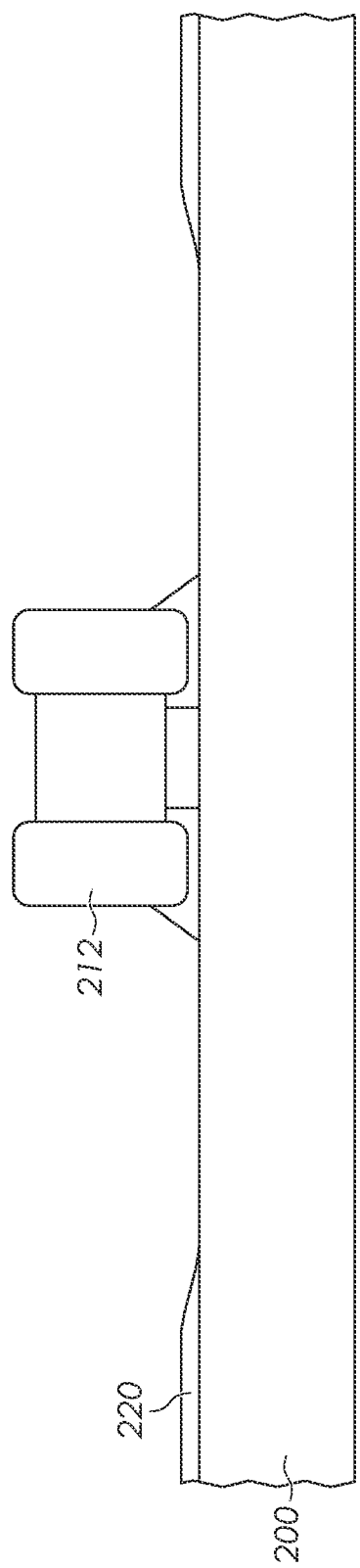

FIG. 2h shows component 212 with coating 220 removed over the component. Component 212 can easily be desoldered and replaced with a working component to repair PCB 200. After component 212 is replaced, coating 220 can be reapplied over the component to make sure that PCB 200 is fully protected. Coating 220 can be applied by spraying a silicone fluid over the entire PCB 200 as shown in FIG. 2b, or just the area where the coating was removed. Coating 220 can also be replaced by brushing an uncured silicone fluid over component 212, or by any other suitable method.

Using solvent composition 100, with a mixture of oxygenated solvent 110 and siloxane solvent 112, to remove coating 220 reduces cost and problems of PCB rework. Coating 220 is dissolved faster so solvent composition 100 can be removed quicker than with purely siloxane solvent 112. Having solvent on PCB 200 for less total time reduces the likelihood of damage to the PCB. The addition of oxygenated solvent 110 not only removes coating 220 faster by attacking the silanol network within the coating, but also helps remove other contaminants that siloxane solvent 112 alone would not remove.

Solvent composition 100 is usable and provides benefits in any situation where a silicone substance needs to be removed. Misting applicator machines, such as the one shown in FIG. 2b with nozzle 222, commonly need to be cleaned. For instance, if a different liquid besides the uncured silicone fluid needs to be sprayed then the existing silicone within and on the machine will need to be fully removed. Solvent composition 100 can be used to clean nozzles, flow lines, holding tanks, and other parts of misting machines. Misting can also create a mess on the outside of the machine, or on nearby objects, that can be cleaned with solvent composition 100.

Silicone calking is commonly used in a variety of industries and around the home as a sealant. Silicone calking, which is notoriously difficult to remove cleanly, can be removed with solvent composition 100. Silicone calking may need to be removed when replacing one of the components that the silicone calking contacts, or just to replace the silicone calking if the seal fails. Solvent composition 100 can also be used to remove silicone-based adhesives, greases, etc. Siloxane solvent 112 breaks down the silicone while oxygenated solvent 110 dissolves other additives commonly used.

Silicone heat transfer fluids are commonly used in a wide variety of industries but are problematic to remove or clean. Silicone heat transfer fluid can require cleaning because of an inadvertent spill that creates a mess. In other cases, a silicone heat transfer fluid is intentionally applied to parts for testing purposes, and then needs to be cleaned.

Solvent composition 100 is also useful in uranium extraction. Silicone fluids are used to coat beads of material that uranium is to be extracted from. The silicone fluids expand the beads and pick up uranyl nitride that is created. Using solvent composition 100 removes the silicone from the beads effectively and economically.

While one or more embodiments of the present invention have been illustrated in detail, the skilled artisan will appreciate that modifications and adaptations to those embodiments may be made without departing from the scope of the present invention as set forth in the following claims.

What is claimed:

1. A method of removing a silicone conformal coating from a printed circuit board, comprising:
   A) providing a solvent composition including an oxygenated solvent and a siloxane solvent;
   B) providing a printed circuit board (PCB) including a first electrical component mounted to the PCB and a silicone conformal coating deposited over the PCB and first electrical component;
   C) removing only a portion of the silicone conformal coating over the first electrical component by using the solvent composition to dissolve the portion of the silicone conformal coating;
   D) replacing the first electrical component with a second electrical component after removing the portion of the silicone conformal coating; and
   E) replacing the portion of the silicone conformal coating with a second silicone conformal coating.

2. The method of claim 1, further including applying the solvent composition as an aerosol stream.

3. The method of claim 1, wherein the siloxane solvent includes hexamethyldisiloxane or octamethyltrisiloxane.

4. The method of claim 1, wherein the solvent composition includes at least 15% of the siloxane solvent by weight.

5. The method of claim 1, wherein the oxygenated solvent includes propylene glycol n-butyl ether and the siloxane solvent includes decamethyltetrasiloxane.

6. The method of claim 1, wherein the solvent composition is an azeotrope.

7. The method of claim 1, further including selecting the siloxane solvent from a group consisting of hexamethyldisiloxane, octamethyltrisiloxane, decamethyltetrasiloxane, dodecamethylpentasiloxane, polydimethylsiloxane, phenylmethylsiloxane, dimethyl-diphenylsiloxane, cyclomethicone, octamethylcyclotetrasiloxane, decamethylcyclopentasiloxane, dodecamethylcyclohexasiloxane, and polymethylhydrogensiloxane.

8. The method of claim 7, further including selecting the oxygenated solvent from a group consisting of ethylene glycol, diethylene glycol, triethylene glycol, propylene glycol, dipropylene glycol, tripropylene glycol, butylene glycol, dibutylene glycol, tributylene glycol, pentylene glycol, dipentylene glycol, tripentylene glycol, hexylene glycol, dihexylene glycol, trihexylene glycol, heptylene glycol, diheptylene glycol, triheptylene glycol, octylene glycol, dioctylene glycol, and trioctylene glycol.

9. The method of claim 7, further including selecting the oxygenated solvent from a group consisting of propylene glycol methyl ether, dipropylene glycol methyl ether, tripropylene glycol methyl ether, propylene glycol methyl ether acetate, dipropylene glycol methyl ether acetate, propylene glycol n-propyl ether, dipropylene glycol n-propyl ether, propylene glycol n-butyl ether, dipropylene glycol n-butyl ether, tripropylene glycol n-butyl ether, propylene glycol phenyl ether, propylene glycol diacetate, dipropylene glycol dimethyl ether, diethylene glycol ethyl ether, diethylene glycol methyl ether, diethylene glycol n-butyl ether, diethylene glycol hexyl ether, diethylene glycol n-butyl ether acetate, ethylene glycol propyl ether, ethylene glycol n-butyl ether, ethylene glycol hexyl ether, ethylene glycol n-butyl ether acetate, triethylene glycol methyl ether, triethylene glycol ethyl ether, triethylene glycol n-butyl ether, ethylene glycol phenyl ether, and ethylene glycol n-butyl ether.

10. The method of claim 1, further including applying the solvent composition using a dropper.

11. The method of claim 1, further including scrubbing the portion of the silicone coating with a brush while the solvent composition is disposed on the portion of the silicone coating.

* * * * *